United States Patent [19]

Gosling et al.

[11] 4,059,030

[45] Nov. 22, 1977

[54] MECHANICAL GEARING

[75] Inventors: Alexander Bennett Gosling, Cambridge; Dexter Robert Plummer, Ongar; Colin Howard Stanwell-Smith, Cambridge, all of England

[73] Assignee: Strathearn Audio Limited, Belfast, Northern Ireland

[21] Appl. No.: 635,071

[22] Filed: Nov. 25, 1975

[30] Foreign Application Priority Data

Nov. 27, 1974  United Kingdom ............... 51444/74

[51] Int. Cl.² .............................................. F16H 13/06
[52] U.S. Cl. .......................................... 74/798; 74/206
[58] Field of Search ........................... 74/798, 640, 206

[56] References Cited

U.S. PATENT DOCUMENTS

| | | | |
|---|---|---|---|
| 2,935,714 | 5/1960 | Barden et al. | 74/798 |
| 3,005,358 | 10/1961 | Musser | 74/798 |
| 3,199,370 | 8/1965 | Prior | 74/640 |
| 3,304,809 | 2/1967 | Hellen | 74/798 |
| 3,529,491 | 9/1970 | Stauber | 74/640 |
| 3,555,929 | 1/1971 | Hossfeld | 74/640 |

*Primary Examiner*—Samuel Scott
*Assistant Examiner*—Allan R. Burke
*Attorney, Agent, or Firm*—Cushman, Darby & Cushman

[57] ABSTRACT

A mechanical gearing with a first rotatable member, three spherical balls in contact with and rotated by the first member, a second relatively flexible member in contact with the balls and a third rigid member fixed with respect to the second member and against which the second member is urged by the balls so that the second and third members rotate with respect to each other.

3 Claims, 2 Drawing Figures

MECHANICAL GEARING

This invention relates to mechanical gearing which is able to provide a reduction ratio, which, in some configurations of the gearing, can be adjustable.

It is known to drive one raceway of a ball bearing whilst applying a load to the bearing and locking the other raceway, and to drive an output shaft by the ball cage. Reduction ratios achieved by such a device range from 2:1 for a thrust bearing configuration to about 6:1 for an angular contact configuration and it is sufficiently cheap to make that it is frequently used as a slow motion device for controls of radios and electronic instruments of moderate price.

A disadvantage of this known device is that backlash exists due to the necessary clearance between the balls and the cage, unless spring loading in some form is introduced, to the detriment of cost and efficiency.

It is also known, in another arrangement, to obtain a very high reduction (up to at least 200:1) by using a flexible member, usually a thin walled cylinder arranged concentrically with a more rigid cylinder. The adjacent diameters of the two cylinders differ by a small fraction of the diameter of one of them. Means to urge the flexible member into contact with the more rigid member at at least one part of the circumference (but usually at 2, 3 or 4 parts) are arranged, capable of revolution about the common axis of the cylinders. The rotation of a frame carrying these means is the input. Of the two cylinders, one is usually fixed and the rotation of the other provides the output. The reduction ratio is $(d_1 - d_2/d_1)$ where $d_1$ and $d_2$ are the adjacent diameters of the two cylinders. It is known for the two cylindrical members to be in toothed engagement, instead of relying on friction.

Disadvantages of this known device are that, if a large ratio is required, $d_1 - d_2$ becomes small and, for that quantity to be controlled, $d_1$ and $d_2$ must be within close tolerances and hence the device becomes expensive. In addition the input member carrying the urging means has to be a comparatively large diameter member rotating at a relatively high speed, and the linear speed of the urging means has to be high, leading to noise, vibration and possibly loss of efficiency.

The present invention provides arrangements which are improvements over the known arrangements and in some configurations of the inventive arrangements the additional advantage of variable ratio is achieved.

In a preferred embodiment of the present invention an input member rotates in contact with at least one planetary element, which in turn is in contact with a relatively flexible element, which in turn is in contact with a less flexible element at at least one point corresponding to the position(s) of the planetary member(s).

In operation rotation is imposed on the input member which causes the planetary member to revolve and rotate in the usual manner of planetary gears. There may be a frame controlling the pitch of the planetary members, but in contrast to the operation of conventional planetary gears, no drive need be taken from such a frame. The planetary members urge the flexible member into contact with the less flexible member at points of the circumference in their vicinity. As the planetary members revolve, so the points of contact of the flexible and less flexible members travel around the circumference. As the circumferences of the flexible and less flexible members in contact are unequal, a slow relative rotation of these two members ensues. This relative motion is the output and commonly either the flexible or the less flexible member is locked to prevent rotation, and the output is taken from the other member. However the device can be used in the differential mode of operation.

There are a number of variations in detail within the scope of this invention, for example the input member and the flexible and less flexible members can be cylindrical, conical or approximately plane. (For the last mentioned case either the flexible or the less flexible member must have a rippled surface to produce a difference in circumferences). It is not even necessary for the flexible and less flexible members to have ruled surfaces, advantageous constructions are possible using surfaces which are at least in part toroidal or ellipsoidal. The planetary members are either solids of revolution, or solids of revolution modified by such features as gear teeth, bearings (for connection to a cage) or they have modifications to their ends for secondary purposes. Favourable shapes are spheres, circular cylinders, circular cones or barrels.

Embodiments of the invention will now be described, by way of example, with reference to the accompanying drawings in which.

Figure 1:
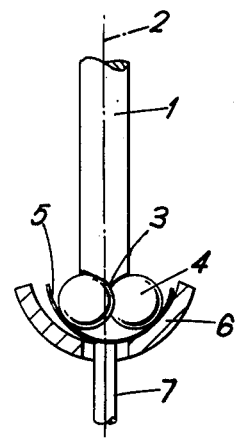
FIG. 1 is an elevation, partly sectioned, through one gearing arrangement.

Referring to FIG. 1, there is shown an input shaft 1 which rotates about an axis 2. The active end of the shaft 1 is tapered to a point, the taper surface 3 being concave, and is thrust axially into contact with three balls 4. The balls 4 are thus urged into contact with a flexible shell member 5 in the shape of a hemisphere. Pressure of the three balls on the shell 5 causes it to contact a rigid hemispherical shell 6 at three points. As the shaft 1 rotates, the balls 4 revolve around the axis 2 at a lower angular velocity than the shaft 1 and the points of contact between the rigid shell 6 and the distorted flexible shell 5 also revolve about the axis 2. This causes the thin shell 5 to rotate slowly relative to the (fixed) shell 6, and this output rotation is delivered to the load (not shown) by a shaft 7 attached to the thin shell 5.

Figure 2:
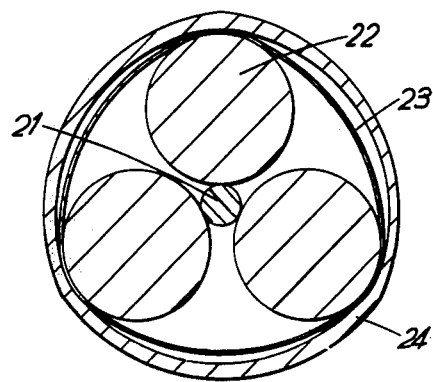
FIG. 2 is a cross-section through another gearing arrangement.

In another embodiment shown in FIG. 2, a cylindrical input shaft 21 is in contact with three cylindrical planetary rollers 22. The rollers 22 are contained by a flexible tube 23 whose free circular shape is too small to circumscribe the rollers 22, so that it is distorted out of the round by them. The tube 23 is itself enclosed by a less flexible tube 24. The internal diameter of the tube 24, in its free state, is larger than the external diameter of the tube 23 in its free state, but it is small enough to be slightly distorted when stretched over the roller assembly. The operation of this embodiment of the invention is similar to that of the first described embodiment, the output being taken from an axial extension of the tube 23. The particular virtues of this configuration are that all of the parts are of circular cross-section and are thus particularly easy to manufacture for example by turning or by extrusion; no thrust bearings are necessary, the spring forces for the friction necessary in the drive being a contained set of reactions to the deformation of the tube 24.

In a further embodiment, which will be described with reference to FIG. 2, since its cross-section is as shown in FIG. 2, the part 21 is the conical end of an input shaft and it is in contact with three spherical rollers 22. The rollers 22 are in contact with a thin walled cone 23 which contacts a more rigid circular cone 24. The operation is similar to that of the embodiment previously described with reference to FIG. 2, of which it is a variation. However, it will be appreciated that, in this further embodiment, relative axial movement between the rollers 22 and either of the cones 23 or 24, but preferably the former, results in a change in the difference of circumference in contact and hence a change in gear ratio. In particular the ratio may be varied continuously to zero, which is particularly useful.

It will be appreciated that, although the invention has been described with reference to particular embodiments, by way of example, variations and modifications can be made within the scope of the invention.

We claim:

1. A gearing arrangement including a first rotatable member, a planetary element in contact with the first member, the said planetary element being caused to rotate by the rotation of the first member, a second relatively flexible rotatable member in contact with the planetary element and a third member which is rigid and fixed relative to the second member and against which the second member is urged by the planetary element, said second and third members being substantially hemispherical and hollow.

2. A gearing arrangement as claimed in claim 1 including a spherical planetary element.

3. A gearing arrangement as claimed in claim 2 including a first rotatable member having a tapered surface in contact with the spherical element.

* * * * *